United States Patent

Liskowitz

[15] 3,653,767
[45] Apr. 4, 1972

[54] PARTICLE SIZE DISTRIBUTION MEASUREMENT USING POLARIZED LIGHT OF A PLURALITY OF WAVELENGTHS

[72] Inventor: John W. Liskowitz, Belle Meade, N.J.
[73] Assignee: American Standard Inc., New York, N.Y.
[22] Filed: Nov. 12, 1968
[21] Appl. No.: 774,894

Related U.S. Application Data

[63] Continuation-in-part of Ser. No. 629,568, Apr. 10, 1967, abandoned.

[52] U.S. Cl................356/102, 250/218, 356/104, 356/114
[51] Int. Cl.............G01n 15/02, G01n 21/00, G01n 21/40
[58] Field of Search..............356/102–104, 114–118, 356/207, 208; 250/218

[56] References Cited

UNITED STATES PATENTS

| | | | |
|---|---|---|---|
| 3,499,159 | 3/1970 | Carrier et al. | 356/103 |
| 2,858,727 | 11/1958 | Stamm et al. | 356/104 |
| 2,877,683 | 3/1959 | Fischer | 250/218 X |
| 3,283,644 | 11/1966 | Saltzman | 356/114 |
| 3,373,652 | 3/1968 | Flader | 356/115 X |
| 3,420,609 | 1/1969 | Kozawa | 356/104 |
| 3,450,477 | 6/1969 | Meltzer | 356/114 |

OTHER PUBLICATIONS

Vogel et al., Rev. Sci. Inst., Vol. 38, No. 4, 4/67, pp. 499–501.
Weissberger, Phys. Meth. Org. Chem., 1960, Interscience Pub. N.Y., pp. 2125–2128.
Zimm, J. Chem. Phys., Vol. 16, No. 12, 12/68, pp. 1099–1116.
Wright, Rev. Sci. Inst. Vol. 28, No. 2, 2/57, pp. 129–134.

Primary Examiner—Ronald L. Wibert
Assistant Examiner—Warren A. Sklar
Attorney—Sheldon H. Parker, Tennes I. Erstad and Robert G. Crooks

[57] ABSTRACT

This invention relates to the determination of particle size distributions in fluid mediums; and more particularly, to the use of a system in which polarized light is scattered by the particles and therefore depolarized, and the degree of depolarization is related to the particle size and wave-length of the light. In one form of the invention, the intensity of light which has its optical axis normal to that of the polarized light and which has been scattered in a backward direction, is measured and compared with the intensity of light which has its optical axis parallel to that of the polarized light and which has been scattered in the aforesaid direction. The ratio of the intensity of the normal polarity light to the parallel polarity light represents the degree of depolarization of the scattered light. The wave-length of the polarized light is varied while the concentration of particles in the fluid is held in constant. The particle size distribution is determined from changes in the degree of depolarization.

3 Claims, 5 Drawing Figures

3,653,767

INVENTOR
John W. Liskowitz

ATTORNEY

PARTICLE SIZE DISTRIBUTION MEASUREMENT USING POLARIZED LIGHT OF A PLURALITY OF WAVELENGTHS

CROSS-REFERENCE TO RELATED APPLICATIONS

This application is a continuation-in-part of the U.S. Pat. application Ser. No. 629,568, filed Apr. 10, 1967, now abandoned.

BACKGROUND OF THE INVENTION

1. Field of the Invention

This invention relates to the determination of particle size distributions in fluid mediums; and more particularly, to the use of a system in which polarized light is scattered by the particles and therefore depolarized, and the degree of depolarization is related to the particle size and wave-length of the light.

2. Description of the Prior Art

It is known, for example, that suspended matter in water can be determined by its optical techniques such as light absorption and light scattering techniques. Instruments have been developed for the measurement of turbidity by measuring the light scattered at a definite angle to the incident light, such as 35°, 45°, 68° or 90°. It has been found to be difficult to correlate particle concentrations as weight of suspended matter to the amount of light scattered in one direction in cases in which the particles vary in and/or shape, size, because of the dependency of the measurement system upon particle size and shape. Variations in the intensity of the light source also tend to affect the measurements and therefore very stable light sources are required. The use of an integrating sphere type of instrument which measures the total amount of light scattered in all directions has been used in order to eliminate the dependency of the system upon particle size and shape.

The depolarization measurements have been used primarily to determine the size and anisotrophy of scattered particles. This normally requires that the concentrations of the solute be varied so that extrapolations to infinite dilution can be achieved. In this manner, secondary or multiple scattering which will interfere with these measurements is eliminated.

SUMMARY OF THE INVENTION

It has now been found that the measuring of the degree of depolarization of light of varying wave-lengths that has undergone secondary or multiple scattering, can be used to determine the size distribution of particles suspended in a fluid.

In accordance with the present invention, polarized light is transmitted through the fluid being analyzed, and the intensity of light which has its optical axis normal to that of the polarized light and which has been scattered in a backward direction, is measured and compared with the intensity of light which has its optical axis parallel to that of the polarized light and which has been scattered n the aforesaid direction. The ratio of the intensity of the normal polarity light to the parallel polarity light represents the degree of depolarization of the scattered light. The wave-length of the polarized light is varied while the concentration of particles in the fluid is held constant. The particle size distribution is determined from changes in the degree of depolarization.

BRIEF DESCRIPTION OF THE DRAWINGS

The terms normal polarity light and parallel polarity light as well as other terms, and the objects and advantages of the invention will become evident and will be more fully understood, from the following description when read in conjunction with the drawings wherein.

DESCRIPTION OF THE PREFERRED EMBODIMENTS

Figure 1:
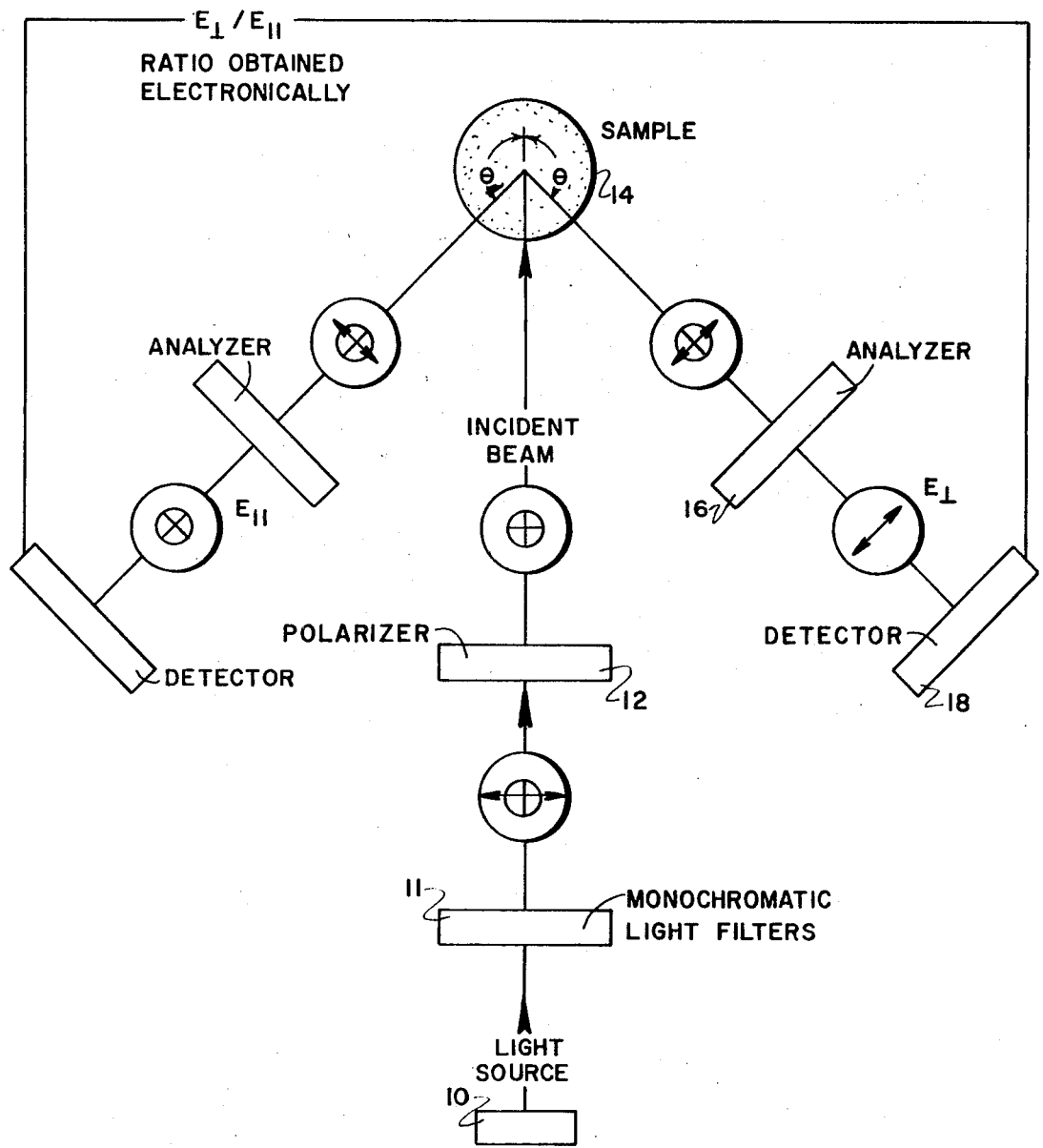
FIG. 1 is a schematic representation of an apparatus in accordance with the present invention.
Figure 3:
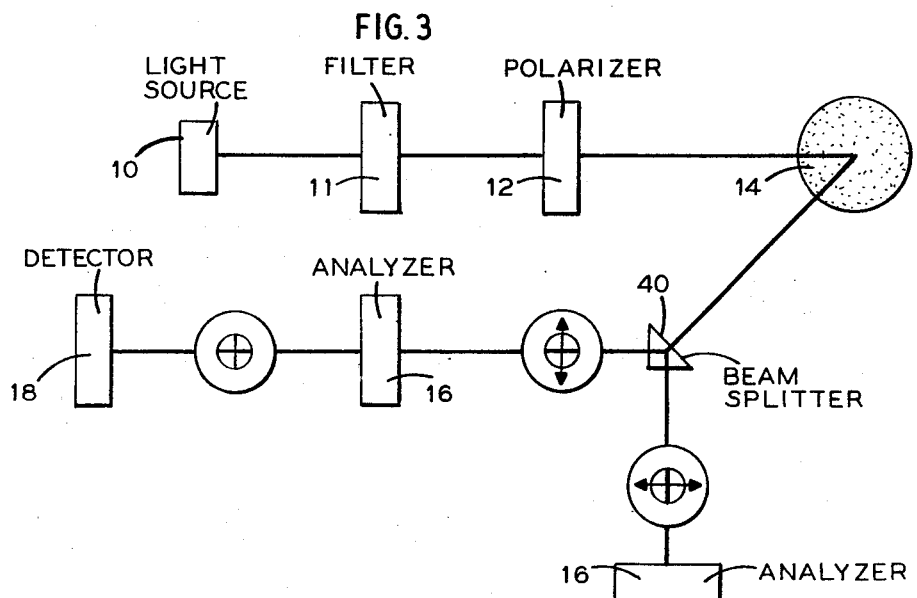
FIG. 3 is a schematic representation of another modification of an apparatus for use in the present invention.

As shown in FIG. 1, a source of light 10, such as a mercury lamp, or a tungsten, or Xenon lamp, depending upon the desired wave-length, is polarized by means of a conventional polarizer 12. The light source can either be one which produces only a desired wave length or filters can be used to restrict the light to monochromatic light, or the desired wavelength.

It should be understood that the light filter can be positioned any where between the light source and the detector. In a system which employs a pair of analyzers and detectors, it is obviously most dangerous to employ the filter between the light source and the sample rather than between the sample and the detector because in the former case only a single filter unit is required, whereas in the latter case, a pair of equivalent units is required. Differences in the light transmission characteristics in the two filter units will introduce errors into the system.

The beam of the polarized light passes through the sample 14, and is scattering in many directions due to primary as well as repeated or multiple scattering of the solid particles suspended in the sample. An analyzer 16, and a detector 18, are positioned so as to receive light scattered in a backward direction, at a particular angle and in a plane which is defined by the direction of the incident and scattered light and is approximately perpendicular to the plane of polarization of the incident radiation.

The angle $\theta$ between the path of the transmitted light and the path of the scattered light will hereinafter, for convenience, be referred to as the observation angle.

A number of variations in the particular arrangement of the analyzer and detector are possible. For example, in order to avoid any errors which can result from having the angle $\theta$ differ between the $E_\perp$ and $E_\parallel$ determinations, and rather than using two separate analyzers and detectors, after a reading for $E_\perp$ is obtained, the analyzer 16 can be rotated 90° about an axis perpendicular to its optical axis, thus making its optical axis parallel to the axis of the polarized light.

Alternatively, a member which rotates the plane of the light 90°, such as quartz crystal, can be positioned between the analyzer 16 and the sample 14. The light can thus be rotated 90° yielding a result comparable to that achieved by rotating the analyzer 16. The light rotating device can be mounted for rotation between the sample 14 and the analyzer 16 or can be mounted for movement into and out of the path of the light. In the latter case, when the light rotating device is out of the path of the light, an equivalent, though non-rotating member, such as a fused quartz plate should be placed in the path of the light so that the light transmission characteristics will remain constant.

The ratio of the intensities $E_\perp/E_\parallel$ represents the depolarization of scattered light. Obviously, other ratios can be used. Basically, the quantities which are measured directly are:

1. the intensity of the component of light having its optical axis parallel to the axis of the polarized light ($E_\parallel$)
2. the intensity of the component of light having its optical axis perpendicular to the axis of the polarized light ($E_\perp$)
3. the intensity of the total light ($E_T$)

$$E_\parallel = E_p + \frac{E_d}{2}$$

$$E_\perp = \frac{E_d}{2}$$

$$E_T = E_p + E_d$$

wherein:

$E_p$ = intensity of polarized light $E_d$ = intensity of depolarized light.

The particle size distribution is ascertained by measuring the degree of depolarization at varying wave-lengths.

The critical factor is encountered is that the degree of depolarization is related to the concentration of particles whose size, that is, diameter, is comparable to or greater than the wave-length of the light.

Figure 2:
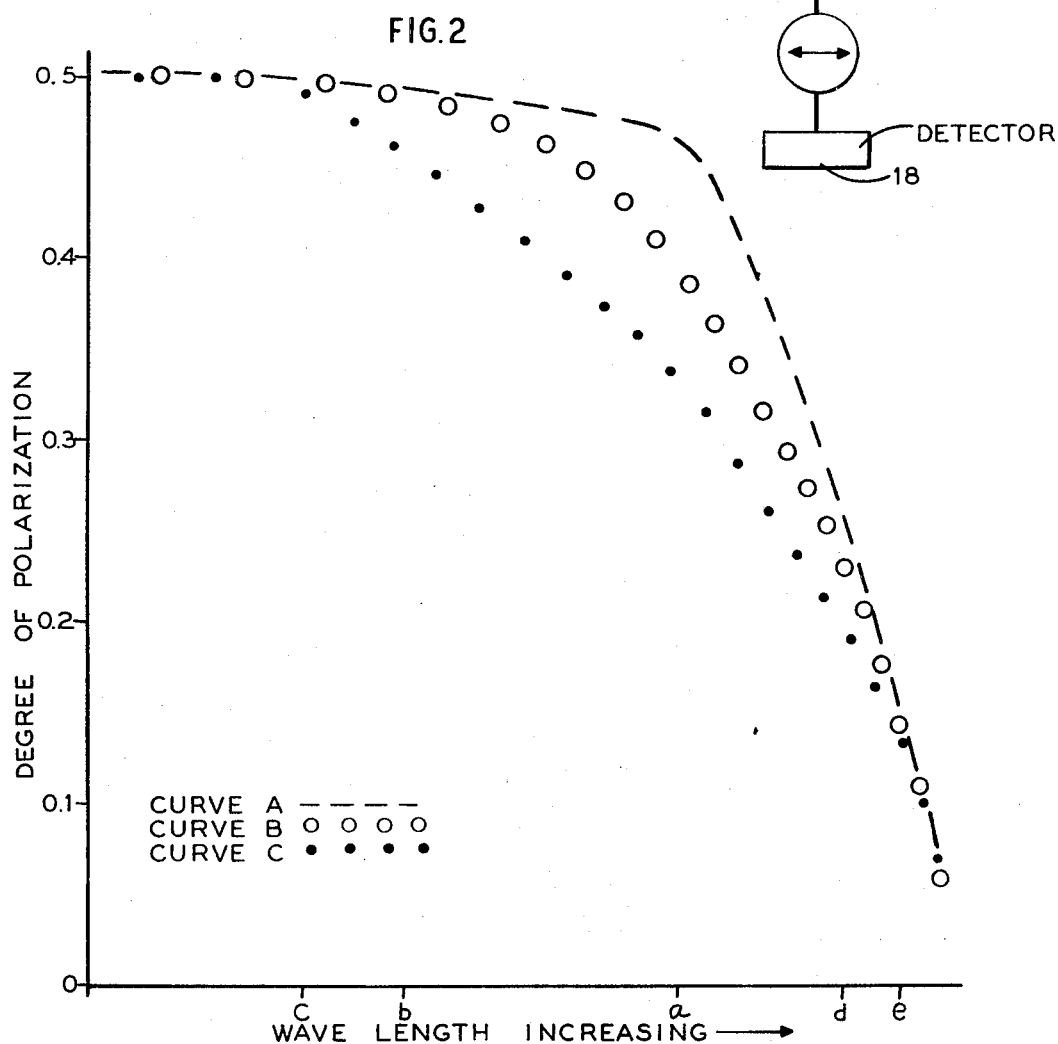
FIG. 2 is a graph which shows the dependence of the degree of depolarization upon the wave-length of the light.
Figure 4:
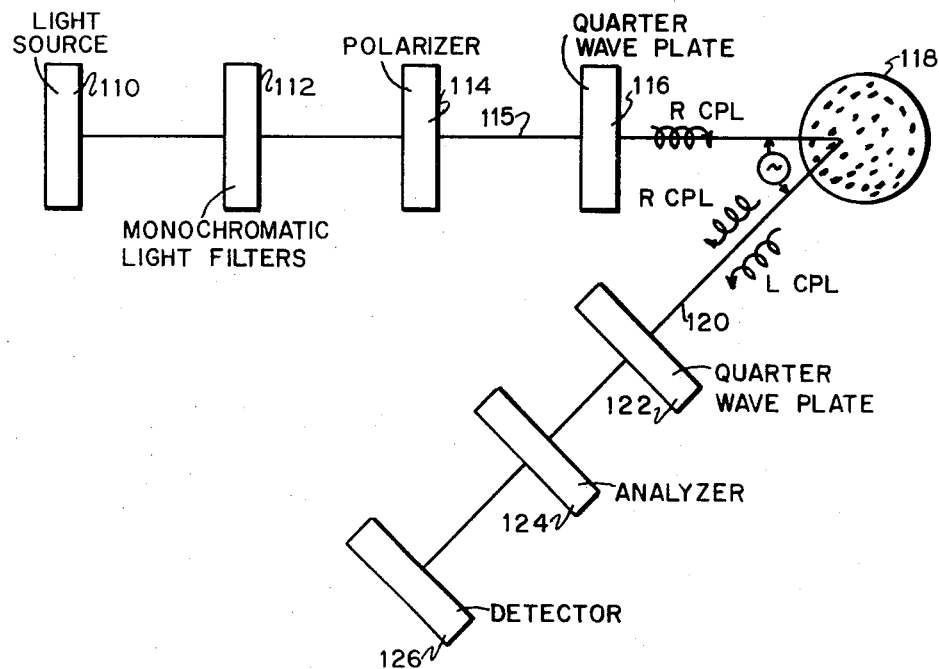
FIG. 4 is a schematic representation of a further modification of an apparatus for use in the present invention.
Figure 5:
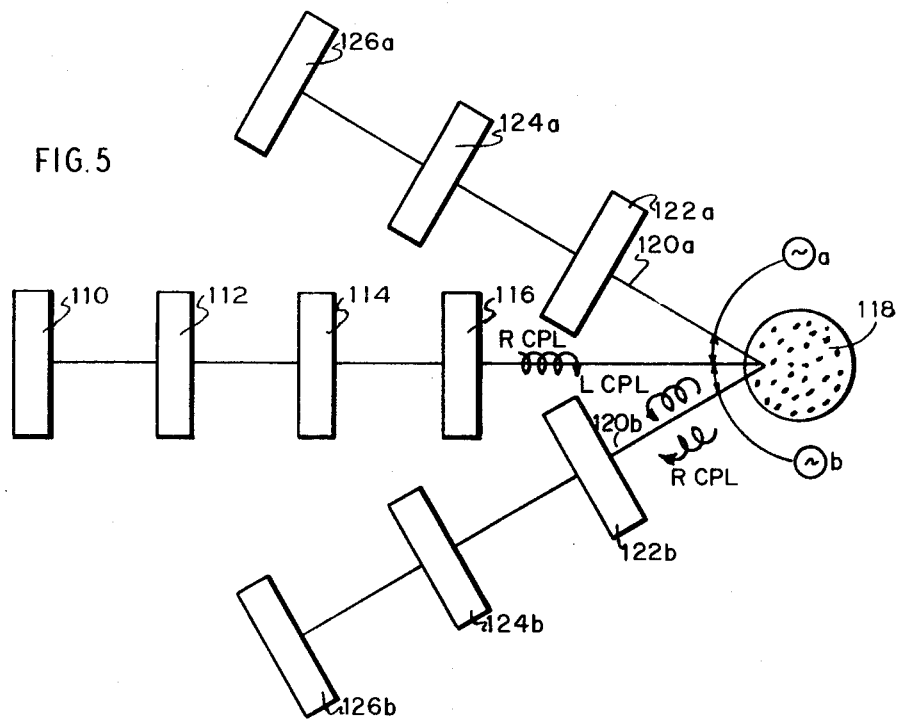
FIG. 5 is a schematic representation of a still further modification of an apparatus for use in the present invention.

As seen in FIG. 2, the system represented by Curve A contains primarily particles about equal in size to wave-length (a). When the incident wave length exceeds (a), the degree of depolarization decreases sharply because the particles now become smaller in size than the wave-length of the incident radiation.

The system represented by Curve B contains particles whose total concentration is equal to that of system A, but whos particle sizes are primarily in the range between wave-lengths (b) to (d).

Systems B and C are unlike system A, to the extent that they are made up of particles of a variety of sizes, whereas system A is essentially a uniform particle size system.

System C, contains the same total concentration of suspended particles as above but whose size are primarily in the range between wave length (c) and (e).

The concentration of particles in a given size range whose limits are comparable to wave-lengths (a) and (d) in the system represented by curve B can be determined as follows:

The total concentration of particles can be ascertained by performing depolarization measurements using an incident wave-length below (b) where there is relatively little change in the degree of depolarization with the wave-length of incident radiation. In this wave-length region, the degree of depolarization is directly related to the total particle concentration.

The above measurements are then repeated by using an incident wave-length corresponding to (a). The degree of depolarization measured at this wave-length is primarily related to those particles whose size is greater than (a). The difference in concentration as obtained from these two measurements represents the concentration of particle whose size is smaller than wave-length (a) and greater than (d).

It is obvious that performing these measurements at a number of different incident wave-lengths will permit one to determine the size distribution of particles in a specific fluid as well as determine the concentration of particles which fall within a specific size range. The greater the number of wave-length one uses, the more exact one can determine the particle size distribution.

It should be noted that the apparatus for carrying out the present invention can take various forms. For example, the problem of the angle $\theta$ for the $E_\perp$ detection system differing slightly from the angle $\theta$ for the $E_\parallel$ detection can be eliminated by using a beam splitter 40, as shown in FIG. III. While the beam splitter provides simultaneous readings without introducing errors due to non-symmetry, it has the disadvantage of decreasing the intensity of the light reaching each of the detectors.

Furthermore, circularly polarized light can be used in place of plane polarized light.

As shown in FIG. IV, light from a source 110 such as mercury, tungsten, or xenon lamp is passed through a monochromatic filter 112 in order to limit the light to a relatively narrow range of wave lengths.

While the use of monochromatic light is preferred, polychromatic light can be used with or without filtering. If light of multiple wave-lengths is used without filtering, the smallest wave-length must be comparable in length to the diameter of the particles being measured in order to produce the effects previously described.

The light is then plane polarized by means of a conventional polarizer filter 114. A quarter wave plate 16 is used in order to circularly polarize the light transmitted through the plane polarizer 115. As shown in FIG. IV the light, which for convenience is indicated as being right circularly polarized light (RCPL) is passed through fluid medium 118. Scattered light 120 is passed through a quarter wave plate 122 which is of the same "handedness" as the quarter wave plate 118. The plate serves to convert the scattered light LCPL) to plane polarized light (PPL) whose plane is perpendicular to the plane of the polarized light resulting from the conversion of the left circularly polarized light to plane polarized light. It should be noted that a quarter wave plate 116 which produces left circularly polarized light can be used just as readily as a plate which produces right circularly polarized light. An analyzer 124, is employed which depending upon its orientation will either transmit light which is vibrating in a plane parallel or perpendicular to the plane of the incident polarized light 115. The amount of energy of the light which passes through the analyzer 124 is measured by means of a detector 126.

As is the case with plane polarized light, two simultaneous readings can be taken by employing two equivalent sets of measuring units. Both units must be positioned at the exact same angle $\theta$, from the direction of the source of the light. One analyzer can then be oriented so as to permit the passage of light which is perpendicularly oriented with respect to the plane of the light of the polarizer 115 ($E_\perp$) while the other analyzer permits the passage of light which is oriented in a plane parallel with respect to the plane of light from the polarizer 115 ($E_\parallel$). A first detector would then measure light which changed from right circularly polarized light to left circularly polarized light as a result of single or primary scattering and one half of the intensity of the light which results from multiple scattering. A second detector would serve to indicate one half of the intensity of the light which results from multiple scattering.

The light which undergoes multiple scattering is converted from its "original handedness," that is, from right circularly polarized light to left circularly polarized light, if it underwent an odd number of reflections and will retain its original handedness if it underwent an even number of reflections. Inasmuch as multiple scattered light gives equal number of odd and even reflections, the analyzer 24b will permit the passage of all of the primary scattered circularly polarized light ($E_p$) plus one half of the multiple scattered light ($E_m$)/2) while the analyzer 24a permits the passage of one half of the multiple scattered light.

The relationships are shown by the following equations:

$$E_\perp = E_p + \frac{E_m}{2}$$

$$E_\parallel = \frac{E_m}{2}$$

In order to maximize the ratio of multiple scattering to primary scattering, it is advantageous to make the angle $\theta$ as large as possible and preferably no less than 90°.

The use of circularly polarized light, as compared to plane polarized light, has the advantage of yielding enhanced sensitivity. Circularly polarized light undergoes a phase change as a result of scattering, whereas plane polarized light undergoes depolarization.

While for convenience, reference is made to solid particles in a fluid, it should be understood that determinations can be made with respect to any turbid medium in which coherent particles, liquid, solid, or even gas bubbles are suspended in a fluid or vacuum, provided there is a difference between the refractive indes of the particles and the fluid.

Although the invention has been described in its preferred forms with a certain degree of particularity, it is understood that the present disclosure of the preferred forms has been made only by way of example, and that numerous changes in the details of construction and the combination and arrangement of parts may be resorted to without departing from the spirit and the scope of the invention.

GLOSSARY OF TERMS

Back Scattering — The phenomena of the light having its direction of travel changed by more than 90° from the direction of travel of the incident light.

Multiple Scattering — The scattering of light by a plurality of articles so that the light changes its direction of travel more than once.

Primary Scattering — The scattering of light off a single particle so that the direction of travel is changed only once.

Analyzer — A device, such as a polarizer prism or a polarizing filter which can isolate the component in scattered light vibrating either parallel or perpendicular to the axis of the polarized light. A polarizer prism functions by absorbing the undesired light.

Detector — A device which is used in measuring the intensity of light transmitted from the analyzer. A photocel or photomultiplier can be used.

Quarter Wave Plate — A device which can convert plane polarized light into either right or left polarized light or right or left circularly polarized light into plane polarized light.

Light — A form of radiant energy, which include ultraviolet, visible and infrared radiation.

$E_{\parallel}$ — The intensity of the component of light having its optical axis parallel to the axis of the incident polarized light.

$E_{\perp}$ — The intensity of the component of light having its optical axis perpendicular to the axis of the incident polarized light.

$E_T$ — Intensity of the total scattered light ($E_{\parallel} + E_{\perp}$).

Degree of Depolarization — Typically refers to the ratio of $E_{\perp}/E_{\parallel}$, although other ratios can be used.

$E_{Polarized}$ — Intensity of plane polarized light. ($E_{\parallel} - E_{\perp}$)

$E_{Depolarized}$ — Intensity of depolarized light ($2 \times E_{\perp}$)

$E_{Multiple}$ — Intensity of circularly polarized light which has undergone primary scattering.

$E_{Primary}$ — Intensity of circularly polarized light which has undergone primary scattering.

Observation Angle — The angle formed by the path of the incident polarized light and the scattered light which is being observed: Light which is transmitted directly through a medium would be observed at an angle of 0°, while the angle for light which is back scattered to the maximum extent is 180°.

Suspended Solids — Any coherent particles, liquid, solid or gaseous bubbles, which are suspended in a fluid or vacuum, provided there is a difference between the refractive index of the particles and the fluid.

The phraseology, and definitions employed herein, are for the purposes of description and enhancing the understanding of the invention rather than for the purpose of establishing limitations of the invention.

What is claimed is:

1. The method of determining the particle size distribution of particles suspended in a fluid medium, comprising the steps of:
   a. polarizing an incident beam of light,
   b. projecting said incident beam of polarized light into the fluid medium to produce primary back-scattered light and multiple back-scattered light,
   c. measuring the intensity of primary back-scattered light coming back at an angle of at least 150° measured with respect to the incident light beam,
   d. measuring the intensity of the multiple back-scattered light coming back at the same angle as in step (c),
   e. varying the wave length of the incident beam of polarized light without varying the polarization thereof,
   f. repeating the measuring steps (c) and (d), and
   g. comparing the measurement of step (c) with the measurement of step (d) for each of a plurality of wavelengths as an indication of the particle size distribution of particles in said fluid medium.

2. The method of claim 1 wherein the step of polarizing an incident light beam comprises plane polarizing an incident light beam.

3. The method of claim 1 wherein the step of polarizing an incident light beam comprises circularly polarizing an incident light beam.

* * * * *